Oct. 14, 1930.    H. J. CRINER    1,778,007
BREAD SLICING MACHINE
Filed Sept. 30, 1929    3 Sheets-Sheet 2

*Harry J. Criner* INVENTOR.

Oct. 14, 1930.    H. J. CRINER    1,778,007
BREAD SLICING MACHINE
Filed Sept. 30, 1929    3 Sheets-Sheet 3
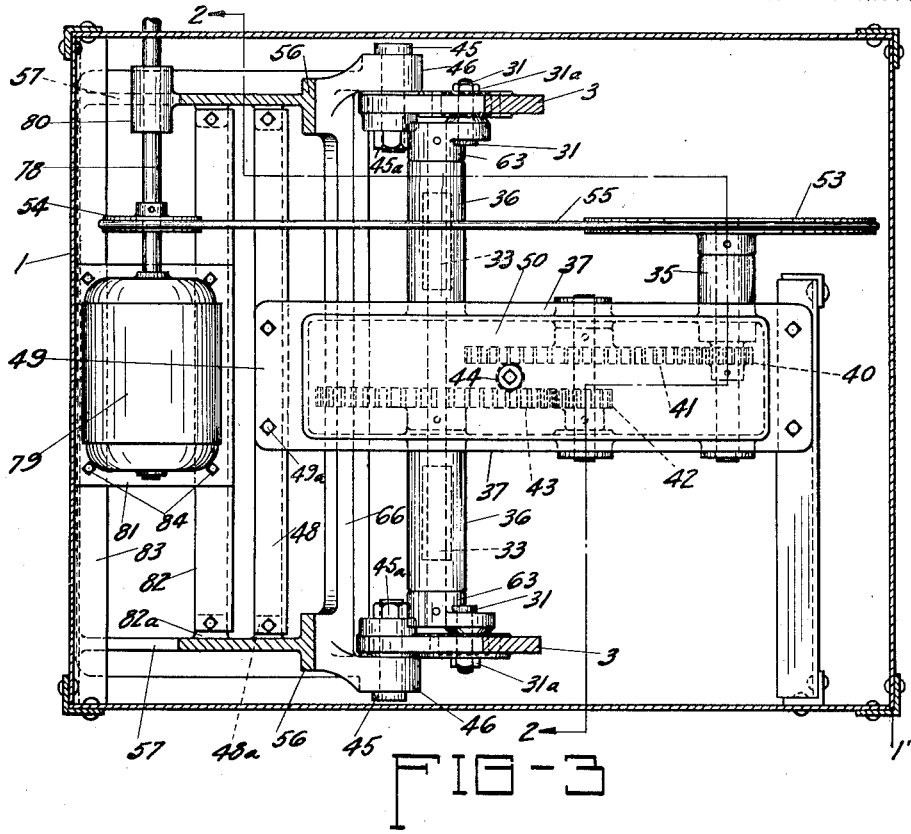
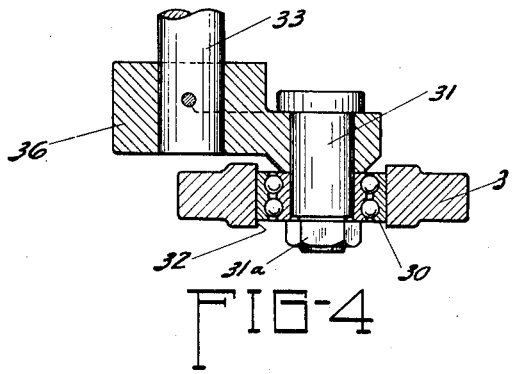
Harry J. Criner INVENTOR.

Patented Oct. 14, 1930

1,778,007

UNITED STATES PATENT OFFICE

HARRY J. CRINER, OF DAVENPORT, IOWA, ASSIGNOR OF ONE-HALF TO A. G. BUSH, OF DAVENPORT, IOWA

BREAD-SLICING MACHINE

Application filed September 30, 1929. Serial No. 396,121.

My invention relates to improvements in bread slicing machines designed to slice an entire loaf of bread at one operation and to retain the slices in their original positions until wrapped.

One of the objects of my invention is to reduce to a minimum the vibration caused by the reciprocating parts.

Another object is to provide means to drive the blades reciprocatingly longitudinally and at the same time to impart a slight edgewise movement to the blades.

Another object is to provide means by which one end of the blades will be caused to travel in an arc-shaped path and the other end of the blades will be caused to travel in the path of an oppositely curved corresponding arc.

Another object of my invention is to provide special means for adjusting the tension upon each blade and to provide special means for keeping each blade under tension at all times.

Another object of my invention is to provide a simple, reciprocating-bladed bread slicing machine of superior efficiency.

Another object is to provide a bread slicing machine in which the blades are positively driven in one direction and driven in the opposite direction by spring-actuated means.

Another object is to provide a bread slicing machine in which each blade is separately actuated and alternate blades are actuated in opposite directions simultaneously.

The preferred form of my apparatus is illustrated in the accompanying drawings which are to be regarded as illustrative and not exclusive.

In the drawings similar numerals refer to similar parts through the several views.

Figure 3 is a horizontal section on the line 3—3 of Figure 1, and Figure 4 is an enlarged sectional detail upon the line 4—4 of Figure 1.

My apparatus comprises a box-like housing, 1, preferably made of sheets of iron or steel reenforced at the corners by angle irons, 1', and secured to a suitable base, 1ª.

The main frame of my machine comprises side columns, 56, with rearwardly extending flanges, 57, and a frame base, 47, formed integral therewith.

Columns, 56, are united at their upper ends by a cross-tie, 65, which may be formed of an I-beam angle iron or other suitable shape.

In suitable openings near the upper ends of the flanges, 57, I mount a transverse pivot-bar, 12, securing same rigidly to the flanges.

Upon the pivot-bar, 12, which acts as a pivot therefor, I mount a plurality of lifting or actuating arms or levers, 7 and 7ª, each of which is provided with a hub, 13, by which it is pivotally secured upon the pivot-bar, 12, as a pivot.

Figure 2:
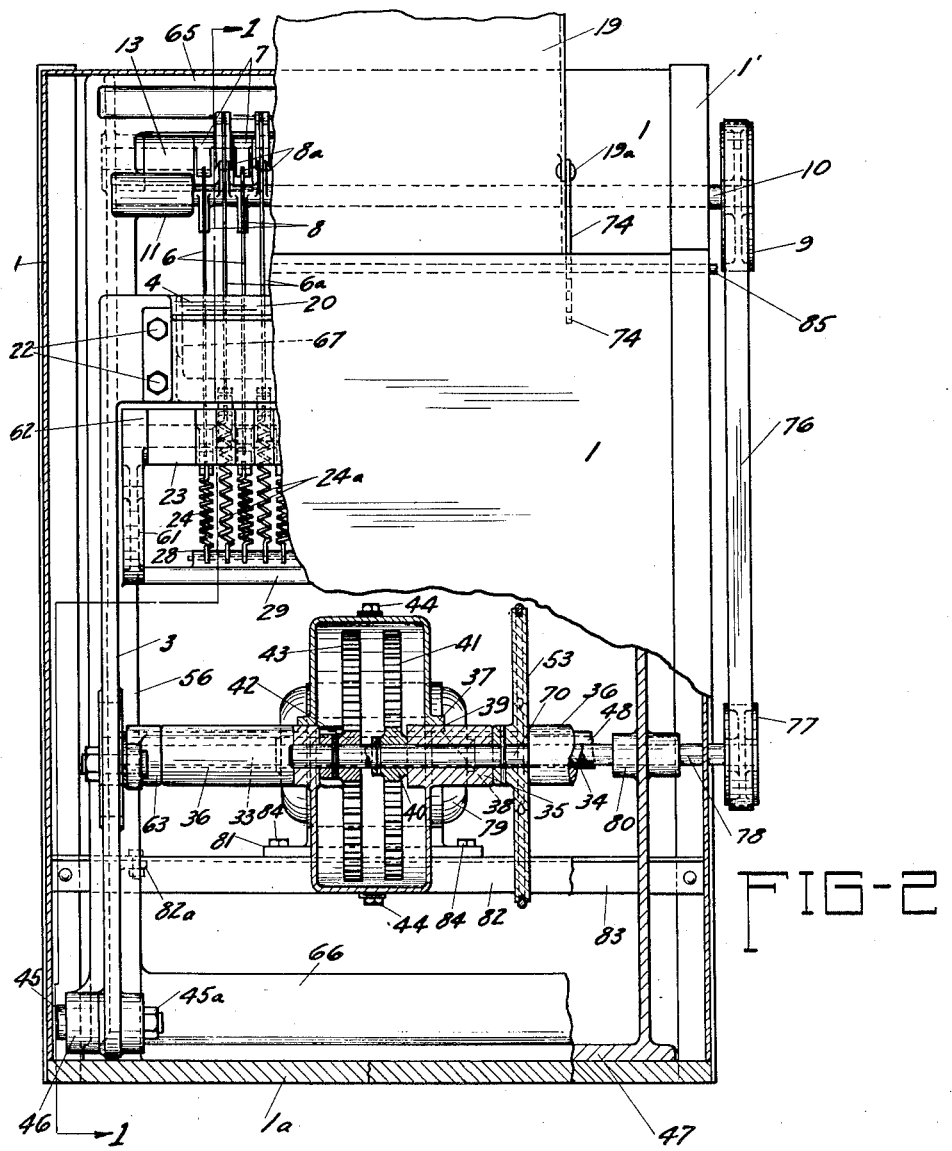
Figure 2 is a front elevation of my machine with the front housing plates broken away to disclose the interior on the line 2—2 of Figure 3. I refer to the righthand side of the machine as shown in Figure 1 as the front, and to the lefthand side of the machine as shown in Figure 1 as the rear.

The levers, 7 and 7ª, extend forwardly from the hubs, 13, and pass over the cam shaft, 10, which is mounted in suitable bearings, 11, formed integral with the columns, 56. One end of the cam shaft, 10, extends through the righthand column, 56, as shown in Figure 2 and has secured thereon a pulley or belt wheel, 9.

The cam shaft, 10, has a plurality of oppositely disposed cams, 8 and 8ª, formed integral therewith, which are preferably substantially circular in form so as to afford the smoothest possible action.

Figure 1:
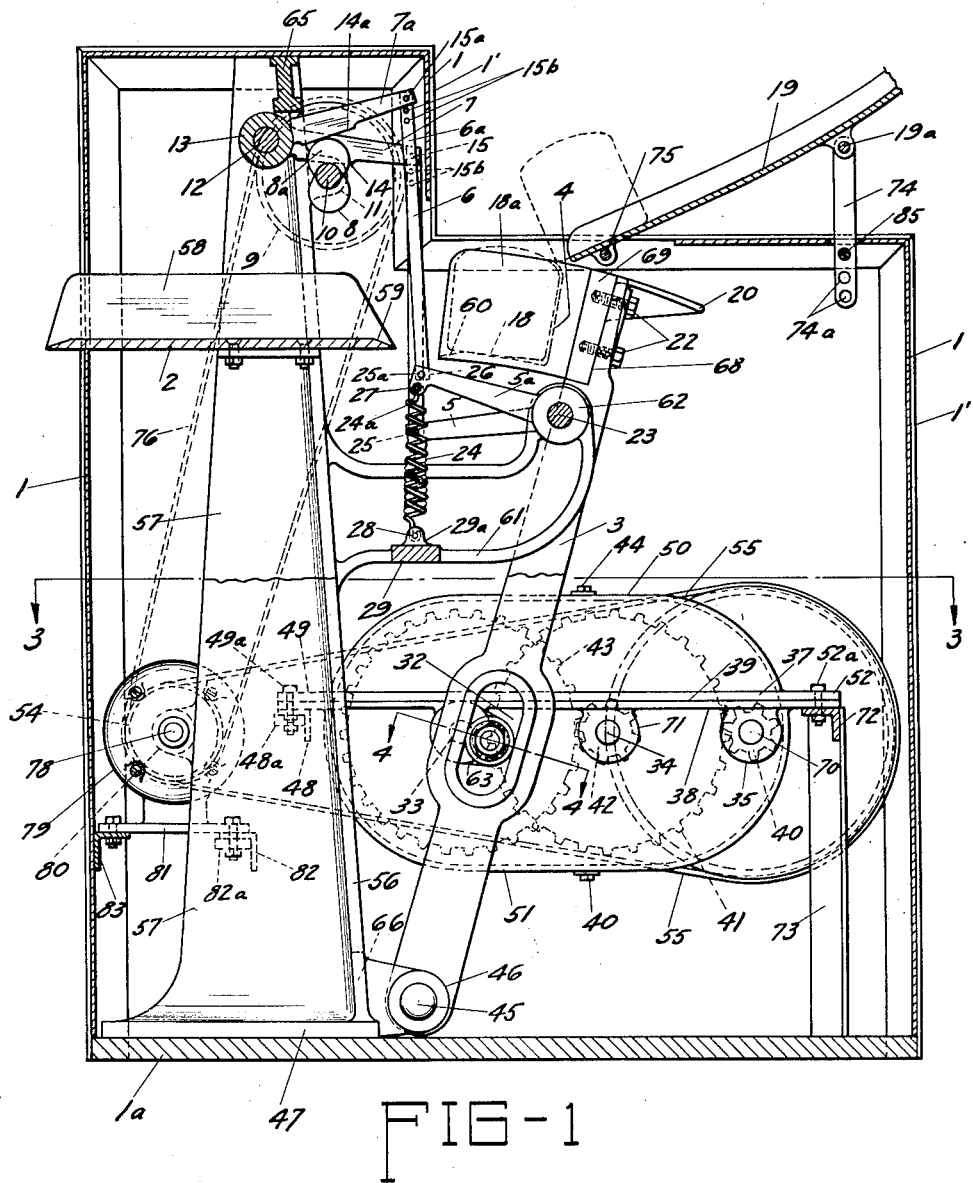
Figure 1 is a side elevation of my machine but with the side plate of the housing removed and the upper blade-driving shaft and cam shaft and adjacent parts in section on the line, 1—1, of Figure 2 and also showing the feed apron and the housing plates in section on the same line.

The levers are so arranged as to be actuated by the cams, 8 and 8ª. In Figure 1, I have shown one of the levers, 7, in its lowermost position and another lever, 7ª, in its uppermost position, with the adjacent cams, 8 and 8ª, in their corresponding positions.

To the free ends of the levers, 7 and 7ª, I attach cutting blades, 6 and 6ª. Brackets, 61, are formed integral with the columns, 56, and extend forwardly therefrom preferably curving upwardly, but the brackets may be of any desired shape. In the outer ends of these brackets, I mount the lower pivot-bar, 23, upon which levers, 5 and 5ª, are pivotally mounted with hubs, 62, surrounding the pivot-bar, 23.

To the free ends of the levers, 5 and 5ª, I attach the upper ends of springs, 24 and 24ª, and the lower ends of the springs are preferably hooked around the pin or spindle, 28, which passes through suitable openings formed in lugs, 29ª, formed integral with a crossbar, 29, which extends transversely across the machine from one of the brackets, 61 to the opposite bracket, 61.

The lower ends of the cutting blades, 6 and 6ª, may be secured to the levers, 5 and 5ª, by any desired means, but I prefer to saw a longitudinal slot or kerf in the free ends of the levers, 5 and 5ª, and secure the lower ends of the cutting blades therein by pins, 25 and 25ª, which pass through suitable holes bored through the levers and the lower ends of the cutting blades. The free ends of the levers, 7 and 7ª, are preferably similarly secured to the upper ends of the blades, 6 and 6ª, by pins, 15 and 15ª. I prefer to form the levers, 5 and 6, of the same length and when so formed, it is obvious that the pins, 15 and 15ª, and the upper ends of the cutting blades will travel in an arc described upon the center of the shaft, 12 and that the pins, 25 and 25ª, will travel in an arc described upon the center of the shaft, 23.

Thus the upper ends of the cutting blades will travel in an arc curved to the left as shown in Figure 1 and the lower ends of the cutting blades will travel in an arc curved to the right as shown in Figure 1, which arc will be very small in proportion to the vertical travel of the blades, but will facilitate the cutting action of the blades.

The pulley, 9, is driven by a belt, 76, which passes over the pulley, 77. mounted upon the motor shaft, 78, which extends from a motor, 79, mounted upon the motor base, 81, which is secured upon angle iron supports, 82, and 83, secured respectively to the flanges, 57, and the rear housing plate.

While I prefer to use a motor drive for this apparatus, it is obvious that any other prime mover may be utilized for that purpose.

In order to feed the bread to the cutting blades. I provide an apron, 19, mounted upon the upper portion of the housing in front of the blades and I provide an opening in the housing between the apron, 19, and the cutting blades. The apron, 19, has its lower end pivotally secured to the housing upon the pivot-bar, 75, and its upper end is secured by pivots, 19ª, to the upper ends of supporting bars, 74. The lower ends of the supporting bars, 74, are provided with a plurality of holes, 74ª, adapted to receive a crossbar, 85, which rests in suitable openings in the sides of the housing and by means of these openings, 74ª, the height of the upper end of the apron, 19, can be adjusted so as to vary the slope thereof.

In order to carry the bread from the apron, 19, to the cutting blades, I provide a carrier or pusher, 69, having supporting fingers, 18, extending rearwardly therefrom and side plates, 18ª, at each side of the fingers, 18.

The pusher, 69, is secured to a pair of pusher arms, 3, by set screws, 22. The lower ends of the pusher arms, 3, are mounted upon pivot bolts, 45, which are secured in suitable bosses, 46, formed integral with the columns, 56, and the pivot bolts, 45, are secured in place by nuts, 45ª, threaded upon the inner ends thereof. A cross-tie, 66, unites the lower ends of the columns, 56, and may be formed integral therewith.

A forwardly projecting shelf, 20, is formed integral with the pusher, 69, and forms a support for each incoming loaf of bread as each preceding loaf resting upon the fingers, 18, is fed to the cutting blades, and as the pusher, 69, is drawn forward to the position shown in Figure 1, the loaf of bread resting on the apron, 20, drops onto the fingers, 18.

The outer ends of the fingers, 18, are preferably beveled slightly as at 60 to facilitate the entry of the end of the receiving table under the cut loaf of bread as the pusher carries the bread to the table.

To adjust the tension upon the cutting blades, I provide a plurality of holes, 15ᵇ, at the upper end of each blade for the entry of the pivots, 15 and 15ª. If desired to increase the tension upon a given blade, the blade is drawn upwardly and the pivot placed through the holes in the adjacent lever 7 or 7ª, and through one of the lower holes, 15ᵇ, in the upper end of the blade. If desired to lessen the tension, the pivot is put through one of the holes nearer the end of the blade. Other forms of adjusting mechanism are in common use and may be substituted as equivalents for the form of adjustment shown, as I do not limit my invention to the precise form shown in the drawings.

I have shown the cutting blades drawn upwardly by power-driven levers and drawn downwardly by spring-actuated levers and the upper and lower levers pivoted at opposite ends. This form of construction is to be understood as presented for purposes of explanation and illustration and not to exclude modifications thereof which may come within the scope of the accompanying claims.

Each pusher arm has an oblong opening, 32, formed therein. A transverse shaft, 33, is mounted upon suitable supports, 36, formed integral with the crank case, and is provided with cranks, 63, at each end thereof. Each crank has a crank pin, 31, upon which a roller, 30, is mounted and secured by a nut, 31ª, threaded upon the crank pin, 31. The rollers, 30, are adapted to fit in the oblong openings, 32, and to roll upon the inner face thereof as the shaft, 33, revolves. The action of these cranks and rollers thus gives the pusher arms, 3, a reciprocating movement toward and away from the cutting blades.

Upon the middle portion of the shaft, 33, I secure a gear wheel, 43, adapted to be driven by the pinion, 42, mounted upon a jack-shaft, 34, which in turn is mounted in suitable bearings formed integral with the lower portion, 51, of the gear housing.

The jack-shaft, 34, also carries a gear wheel, 41, which meshes with a pinion, 40, secured upon the shaft, 70, and the shaft, 70, is mounted in suitable bearings, 35, formed in the gear case.

The shaft, 70, also carries a belt wheel, 53, which is driven by a belt, 55, and the belt, 55, is in turn driven by the pulley, 54, mounted upon the motor shaft, 78.

The face, 4, of the pusher is made with the upper edge projecting slightly toward the blades, and is preferably curved as shown in Figure 1. When so formed, the projecting portion will act as a detent to prevent the bread from being displaced upwardly while being sliced.

A receiving table, 2, is bolted to suitable supports secured to the frame at the rear of the cutting blades and has side plates, 58, suitably secured thereto or formed integral therewith. The front edge, 59, of the bed of the table, 2, is beveled as shown in Figure 1. This table is secured at a height just above the height of the path of the fingers, 18, so that as the pusher carries the bread to the cutting blades, the fingers, 18, will just pass under the beveled edge, 59, of the receiving table and unload the bread from the fingers onto the table. The fingers, 18, are preferably formed integral with the pusher head and the slots between the fingers extend a short distance into the pusher head so as to carry the bread entirely past the cutting blades as the pusher travels to the extreme end of its throw.

In the operation of my apparatus, the loaves of bread are placed upon the apron, 19, either manually or by mechanical means and pass from there to the pusher or carrier where a loaf of bread, 86, is shown in dotted lines. The motor is then started and the belts and gearing drive the cranks, 63, which in turn drive the pusher arms, 3, alternately towards and away from the blades 6 and 6ª.

The fingers, 18, pass through between the blades and the loaf of bread resting upon them is cut by the blades as it passes toward the receiving table.

As the fingers, 18, pass under the receiving table, they leave the loaf of bread they have been carrying, upon the table, 2. As the extension, 20, of the pusher, passes the lower end of the apron, 19, moving toward the blades, 6 and 6ª, it carries the next loaf of bread from the apron, said loaf of bread resting upon the extension, 20, and as the pusher returns to the position shown in Figure 1, this loaf of bread is dropped down upon the fingers, 18, and the motion of the pusher is reversed at the end of its stroke and the operation then repeated.

As each successive loaf of bread reaches the cutting blades, it is acted upon by one-half of the blades moving upwardly and one-half of the blades moving downwardly and this movement of alternate blades in opposite directions tends to stabilize the bread upon the fingers, 18. While I have shown the fingers, 18, extending substantially at right angles to the blades, it is obvious that they may be inclined so as to present the loaf in an inclined position if desired.

In the construction of my machine, I prefer to use aluminum or light-weight alloys or other light material for the upper and lower levers so as to reduce the weight of the reciprocating parts as much as possible.

It is obvious that a large number of light-weight parts reciprocating in alternation will produce much less vibration than the reciprocating motion of heavy crossheads or other forms of construction which combine a large number of cutting blades into a gang or unit and that the use of springs exerting tension in one direction upon the saw blades will reduce vibration arising from their reaching the extreme point of travel in the opposite direction. This is particularly true where the springs exert a downward tension upon the cutting blades, for they will cushion the upward movement of the cutting blades and attached parts, and the downward movement of the cutting blades and attached parts will cause very little vibration if the apparatus is mounted upon a substantial base.

If desired the lower levers may be omitted entirely and the springs connected to the lower ends of the cutting blades.

I claim:

1. A bread slicing machine comprising a frame, an upper pivot-bar mounted therein, a cam-shaft mounted in the frame near the pivot-bar and carrying a plurality of cams united thereto, a plurality of cam-actuated levers having one end revolvably mounted upon the pivot-bar with their intermediate portions resting upon the cams and their free ends provided with means for attaching cutting blades thereto, a plurality of cutting blades having their upper ends attached to the cam levers, and means for actuating the cam shaft.

2. A bread slicing machie comprising a frame, an upper pivot-bar mounted therein, a cam-shaft mounted in the frame near the pivot-bar and carrying a plurality of cams united thereto, a plurality of cam-actuated levers having one end revolvably mounted upon the pivot-bar, their intermediate portions resting upon the cams and their free ends provided with means for attaching cutting blades thereto, a plurality of cutting blades having their upper ends attached to the cam levers, a lower pivot-bar mounted in the frame, a plurality of lower levers having one end revolvably mounted on the lower pivot-bar and their free ends attached to the lower ends of the cutting blades respectively, means for actuating the cam levers, and independent means to actuate the lower levers.

3. A bread slicing machine comprising a frame, an upper pivot-bar mounted therein, a cam-shaft mounted in the frame near the pivot-bar and carrying a plurality of cams united thereto, a plurality of cam-actuated levers having one end revolvably mounted upon the pivot-bar, their intermediate portions resting upon the cams and their free ends provided with means for attaching cutting blades thereto, a plurality of cutting blades having their upper ends attached to the cam levers, a lower pivot-bar mounted in the frame, a plurality of lower levers having one end revolvably mounted on the lower pivot-bar and their free ends attached to the lower ends of the cutting blades respectively, power-driven means for actuating the cam levers, and spring-impelled means for actuating the lower levers.

4. A bread slicing machine comprising a frame, an upper pivot-bar mounted therein, a cam-shaft mounted in the frame near the pivot-bar and carrying a plurality of cams united thereto, a plurality of cam-actuated levers having one end revolvably mounted upon the pivot-bar, their intermediate portions resting upon the cams and their free ends provided with means for attaching cutting blades thereto, a plurality of cutting blades having their upper ends attached to the cam levers, a lower pivot-bar mounted in the frame, a plurality of lower levers having one end revolvably mounted on the lower pivot-bar and their free ends attached to the lower ends of the cutting blades respectively, a pulley secured upon one end of the cam-shaft, power-driven means for driving the pulley, and a plurality of springs united to the frame adjacent the free ends of the lower levers and having their upper ends united to the free ends of the lower levers.

5. A bread slicing machine comprising a frame, an upper pivot-bar mounted therein, a cam-shaft mounted in the frame near the pivot-bar and carrying a plurality of cams united thereto, a plurality of cam-actuated levers having one end revolvably mounted upon the pivot-bar, their intermediate portions resting upon the cams and their free ends provided with means for attaching cutting blades thereto, a plurality of cutting blades having their upper ends attached to the came levers, a lower pivot-bar mounted in the frame, a plurality of lower levers having one end revolvably mounted on the lower pivot-bar and their free ends attached to the lower ends of the cutting blades respectively, the upper levers being pivoted at one end and the lower levers being pivoted at the opposite end.

6. A bread slicing machine comprising a frame, an upper pivot-bar mounted therein, a cam-shaft mounted in the frame near the pivot-bar and carrying a plurality of cams united thereto, a plurality of cam-actuated levers having one end revolvably mounted upon the pivot-bar, their intermediate portions resting upon the cams and their free ends provided with means for attaching cutting blades thereto, a plurality of cutting blades having their upper ends attached to the cam levers, a lower pivot-bar mounted in the frame, a plurality of lower levers having one end revolvably mounted on the lower pivot-bar and their free ends attached to the lower ends of the cutting blades respectively, the upper levers being pivoted at one end and the lower levers being pivoted at the opposite end, means for actuating the cam levers, and independent means to actuate the lower levers.

7. A bread slicing machine comprising a frame, an upper pivot-bar mounted therein, a cam-shaft mounted in the frame near the pivot-bar and carrying a plurality of cams united thereto, a plurality of cam-actuated levers having one end revolvably mounted upon the pivot-bar, their intermediate portions resting upon the cams and their free ends provided with means for attaching cutting blades thereto, a plurality of cutting blades having their upper ends attached to the cam levers, a lower pivot-bar mounted in the frame, a plurality of lower levers having one end revolvably mounted on the lower pivot-bar and their free ends attached to the lower ends of the cutting blades respectively, the upper levers being pivoted at the rear end thereof and the lower levers being pivoted at the front end thereof.

8. A bread slicing machine comprising a frame, an upper pivot-bar mounted therein, a cam-shaft mounted in the frame near the pivot-bar and carrying a plurality of cams united thereto, a plurality of cam-actuated levers having one end revolvably mounted upon the pivot-bar, their intermediate portions resting upon the cams and their free ends provided with means for attaching cutting blades thereto, a plurality of cutting blades having their upper ends attached to the cam levers, a lower pivot-bar mounted in the frame, a plurality of lower levers having one end revolvably mounted on the lower pivot-bar and their free ends attached to the lower ends of the cutting blades respectively, the upper levers being pivoted at the rear end thereof and the lower levers being pivoted at the front end thereof, means for actuating the cam levers, and independent means to actuate the lower levers.

10. A bread slicing machine comprising a frame, an upper pivot-bar mounted therein, a cam-shaft mounted in the frame near the pivot-bar and carrying a plurality of cams united thereto, a plurality of cam-actuated levers having one end revolvably mounted upon the pivot-bar, their intermediate portions resting upon the cams and their free ends provided with means for attaching cutting blades thereto, a plurality of cutting blades having their upper ends attached to the cam levers, a lower pivot-bar mounted in the frame, a plurality of lower levers having one end revolvably mounted on the lower pivot-bar and their free ends attached to the lower ends of the cutting blades respectively, the upper levers being pivoted at one end and the lower levers being pivoted at the opposite end, and means to actuate the upper and lower levers simultaneously.

10. A bread slicing machine comprising a frame, an upper pivot-bar mounted therein, a cam-shaft mounted in the frame near the pivot-bar and carrying a plurality of cams united thereto, a plurality of cam-actuated levers having one end revolvably mounted upon the pivot-bar, their intermediate portions resting upon the cams and their free ends provided with means for attaching cutting blades thereto, a plurality of cutting blades having their upper ends attached to the cam levers, a lower pivot-bar mounted in the frame, a plurality of lower levers having one end revolvably mounted on the lower pivot-bar and their free ends attached to the lower ends of the cutting blades respectively, the upper levers being pivoted at the rear end thereof and the lower levers being pivoted at the front end thereof, and means to actuate the upper and lower levers simultaneously.

11. A bread slicing machine comprising a frame, an upper pivot-bar mounted therein, a cam-shaft mounted in the frame near the pivot-bar and carrying a plurality of cams united thereto, a plurality of cam-actuated levers having one end revolvably mounted upon the pivot-bar, their intermediate portions resting upon the cams and their free ends provided with means for attaching cutting blades thereto, a plurality of cutting blades having their upper ends attached to the cam levers, a lower pivot-bar mounted in the frame, a plurality of lower levers having one end revolvably mounted on the lower pivot-bar and their free ends attached to the lower ends of the cutting blades respectively, the upper levers being pivoted at one end and the lower levers being pivoted at the opposite end, and means to actuate the alternate pairs of upper and lower levers simultaneously in opposite directions.

12. A bread slicing machine comprising a frame, a plurality of separate upper and lower levers pivotally mounted therein and arranged in pairs, one upper and one lower lever constituting each pair, a plurality of blades, each pair of levers having a blade pivotally united thereto, and means for actuating alternate pairs of levers simultaneously in opposite directions.

13. A bread slicing machine comprising a frame, a plurality of separate upper and lower levers pivotally mounted therein and arranged in pairs, one upper and one lower lever constituting each pair, a plurality of blades, each pair of levers having a blade pivotally united thereto, power-driven means for actuating each pair of levers in one direction and spring-actuated means for actuating each pair of levers in the opposite direction.

14. A bread slicing machine comprising a frame, a plurality of separate upper and lower levers pivotally mounted therein and arranged in pairs, one upper and one lower lever constituting each pair, a plurality of blades, each pair of levers having a blade pivotally united thereto, power-driven means for actuating each pair of levers in one direction and spring-actuated means for actuating each pair of levers in the opposite direction, the alternate pairs being actuated simultaneously in opposite directions.

In testimony whereof he affixes his signature.

HARRY J. CRINER.